United States Patent
Lauffer et al.

(10) Patent No.: US 9,665,932 B2
(45) Date of Patent: May 30, 2017

(54) CAMERA BASED CABLE INSPECTION SYSTEM

(71) Applicant: Thales Transport & Security, Inc., Pittsburgh, PA (US)

(72) Inventors: Jason Michael Lauffer, Baden, PA (US); Nicholas Joseph Roefaro, Pittsburgh, PA (US); Jason Alexander Kanczes, Pittsburgh, PA (US); Kevin Frederick Garben, Baden, PA (US)

(73) Assignee: Thales Transport & Security, Inc., Pittsburgh, PA (US)

( * ) Notice: Subject to any disclaimer, the term of this patent is extended or adjusted under 35 U.S.C. 154(b) by 265 days.

(21) Appl. No.: 14/475,912

(22) Filed: Sep. 3, 2014

(65) Prior Publication Data
US 2015/0062328 A1    Mar. 5, 2015

Related U.S. Application Data

(60) Provisional application No. 61/873,099, filed on Sep. 3, 2013.

(51) Int. Cl.
*G06T 7/00*    (2017.01)

(52) U.S. Cl.
CPC .. *G06T 7/0004* (2013.01); *G06T 2207/10016* (2013.01); *G06T 2207/30136* (2013.01)

(58) Field of Classification Search
CPC ......... G06T 7/0004; G06T 2207/10016; G06T 2207/30136
See application file for complete search history.

(56) References Cited

U.S. PATENT DOCUMENTS

| | | | | |
|---|---|---|---|---|
| 4,538,107 A | * | 8/1985 | Varone | G01N 27/82 324/206 |
| 4,887,155 A | * | 12/1989 | Massen | D01G 1/006 250/559.24 |
| 4,988,875 A | * | 1/1991 | Ortiz | G01N 21/88 250/330 |
| 5,821,430 A | * | 10/1998 | Kwun | G01L 5/10 73/581 |
| 6,281,685 B1 | * | 8/2001 | Tuttle | G01R 31/022 324/522 |
| 6,650,815 B2 | * | 11/2003 | Hawtof | G02B 6/03694 385/128 |
| 6,720,873 B1 | * | 4/2004 | Tressler | B61B 12/06 104/173.2 |
| 8,254,660 B2 | * | 8/2012 | Verreet | B66B 7/1238 382/141 |
| 2007/0125182 A1 | * | 6/2007 | Garshelis | G01R 33/038 73/779 |

(Continued)

*Primary Examiner* — Christopher Findley
(74) *Attorney, Agent, or Firm* — Sage Patent Group (57) ABSTRACT

A cable safety and maintenance vision system includes an imaging unit comprising at least one imaging device configured to capture images of a side profile portion of a cable. The cable forms a continuous cable loop. A cable defect detection processor is in communication with the at least one imaging device. The cable defect detection processor is configured to receive images from the at least one imaging device, to identify features in the images that indicate potential defects, and to output a location on the continuous cable loop of the features in the images that indicate potential defects.

20 Claims, 10 Drawing Sheets

(56) References Cited

U.S. PATENT DOCUMENTS

2009/0231123 A1* 9/2009 Rowell .................. B61B 12/06
                                                    340/532
2012/0103225 A1* 5/2012 Gubler ................. B61B 12/002
                                                    104/112

* cited by examiner

MUNI CABLE CAR MONITOR SYSTEM

CABLE INFORMATION PER LINE

| LINE | AVERAGE CABLE DIAMETER (IN) | POSITION OF SPLICE (FT) | NUMBER OF LOCATIONS W/ PROBLEMS | TOTAL NUMBER OF IMAGES | NUMBER OF UNACK ALARMS |
|---|---|---|---|---|---|
| POWELL | 1.240 | 115 | 5 | 367 | 1 |
| MASON | 1.239 | 255 | 6 | 435 | 3 |
| CALIFORNIA | 1.250 | 595 | 3 | 150 | 0 |
| HYDE | 1.245 | 355 | 14 | 672 | 2 |

CABLE ALARM LIST

| LINE | POSITION OF FAULT (FT) | FILE NAME OF IMAGE | UNACK/ACKNOWLEDGED | ALARM SERVIRITY |
|---|---|---|---|---|
| POWELL | 250 | 123496.IMG | UNACK | 1 |
| HYDE | 415 | 123494.IMG | UNACK | 2 |
| CALIFORNIA | 555 | 123490.IMG | UNACK | 1 |
| POWELL | 215 | 123485.IMG | UNACK | 3 |
| CALIFORNIA | 95 | 123481.IMG | ACKNOWLEDGED | 2 |
| MASON | 455 | 123476.IMG | ACKNOWLEDGED | 3 |
| POWELL | 395 | 123475.IMG | UNACK | 2 |
| CALIFORNIA | 435 | 123469.IMG | UNACK | 2 |
| POWELL | 155 | 123464.IMG | ACKNOWLEDGED | 3 |
| POWELL | 325 | 123460.IMG | ACKNOWLEDGED | 1 |
| CALIFORNIA | 655 | 123452.IMG | ACKNOWLEDGED | 3 |
| MASON | 115 | 123449.IMG | ACKNOWLEDGED | 2 |

[ACKNOWLEDGE SELECTED ALARMS] [ACKNOWLEDGE ALL ALARMS] [CLEAR SELECTED ALARMS] [CLEAR ALL ALARMS] [RUN REPORT]

| LINE | POSITION OF FAULT (FT) | CURRENT IMAGE/TOTAL # OF IMAGES AT LOCATION | FILE NAME OF IMAGE | DATE/TIME OF IMAGE |
|---|---|---|---|---|
| POWELL | 250 | 4/45 | 123496.IMG | 12/12/12- 12:45 |

OPEN NEW FILE

NEXT/PREVIOUS IMAGE
- ○ NEXT LOCATION
- ● NEXT IMAGE

PREVIOUS IMAGE ∧

NEXT IMAGE ∨

| LINE | POSITION OF FAULT (FT) | CURRENT IMAGE/TOTAL # OF IMAGES AT LOCATION | FILE NAME OF IMAGE | DATE/TIME OF IMAGE |
|---|---|---|---|---|
| HYDE | 120 | 12/30 | 123706.IMG | 12/12/12- 14:19 |

OPEN NEW FILE

NEXT/PREVIOUS IMAGE
- ○ NEXT LOCATION
- ● NEXT IMAGE

PREVIOUS IMAGE ∧

NEXT IMAGE ∨

CABLE REPORT LIST

| LINE | POSITION OF FAULT (FT) | FAULT # AT LOCATION | FILE NAME OF IMAGE | ACTIVE/ ACKNOWLEDGED | ALARM SERVIRITY | DATE | TIME |
|---|---|---|---|---|---|---|---|
| POWELL | 250 | 14 | 123496.IMG | ACTIVE | 1 | 12/21/13 | 12:41:31 |
| POWELL | 250 | 4 | 123496.IMG | ACKNOWLEDGED | 1 | 12/21/13 | 12:41:51 |
| CALIFORNIA | 95 | 10 | 123481.IMG | ACTIVE | 0 | 12/21/13 | 12:42:24 |
| MASON | 455 | 24 | 123476.IMG | ACTIVE | 0 | 12/21/13 | 12:45:51 |
| POWELL | 395 | 2 | 123475.IMG | ACTIVE | 0 | 12/21/13 | 12:48:23 |
| CALIFORNIA | 95 | 10 | 123481.IMG | ACKNOWLEDGED | 0 | 12/21/13 | 12:50:21 |
| MASON | 455 | 24 | 123476.IMG | ACKNOWLEDGED | 0 | 12/21/13 | 12:50:21 |
| POWELL | 395 | 2 | 123475.IMG | ACKNOWLEDGED | 0 | 12/21/13 | 12:50:21 |
| POWELL | 250 | 5 | 123506.IMG | ACTIVE | 1 | 12/21/13 | 13:01:21 |
| HYDE | 415 | 3 | 123510.IMG | ACTIVE | 0 | 12/21/13 | 13:02:40 |
| CALIFORNIA | 220 | 9 | 123520.IMG | ACTIVE | 0 | 12/21/13 | 13:04:12 |
| POWELL | 250 | 5 | 123506.IMG | ACKNOWLEDGED | 0 | 12/21/13 | 13:04:45 |
| HYDE | 415 | 3 | 123510.IMG | ACKNOWLEDGED | 0 | 12/21/13 | 13:04:45 |
| CALIFORNIA | 220 | 9 | 123520.IMG | ACKNOWLEDGED | 0 | 12/21/13 | 13:04:45 |
| MASON | 455 | 25 | 123524.IMG | ACTIVE | 1 | 12/21/13 | 13:55:41 |
| MASON | 455 | 25 | 123524.IMG | ACKNOWLEDGED | 1 | 12/21/13 | 13:56:20 |

SAVE REPORT TO FILE

PRINT REPORT

CAMERA BASED CABLE INSPECTION SYSTEM

RELATED APPLICATIONS

This application claims priority to U.S. Provisional Application Ser. No. 61/873,099, filed Sep. 3, 2013, the disclosure of which is hereby incorporated by reference in its entirety.

TECHNICAL FIELD

The present invention relates to cable transportation systems and in particular to monitoring defects in moving metal cables of cable transportation systems.

BACKGROUND

Maintaining the integrity of a cable that drives a cable car along a pathway can be an expensive and labor intensive process which is prone to error. Cable inspection is a manual process that is performed through repeated shifts of human inspectors standing watch inside a cable car motor building. The tedious task of inspectors includes observing the cable as it moves past an observation area, with the inspectors looking for a critical part of the cable known as the splice to appear. For the length of cable used by the San Francisco cable car lines, this can take between 10-35 minutes of waiting and much longer if the splice is missed by the inspector. It is also difficult or impossible to see small defects in the cable with even a trained human eye since the cable is moving rapidly (e.g., 10 mph) past the inspector.

Human inspectors are inherently prone to error and limited by constraints of human vision and visual analysis (even for a trained eye). Human inspectors are also subject to fatigue and can be distracted, missing even large defects in the moving cable. Moreover, without stopping movement of the cable, human inspectors have a very limited ability to consistently assess relative defect levels in the moving cable and may not be capable of adequately assessing and/or reporting observed defects which are only momentarily observed as the cable moves at relatively high speed and are not suited for accurately evaluating changes in defects over time.

SUMMARY

In some embodiments, a cable safety and maintenance vision system includes an imaging unit comprising at least one imaging device configured to capture images of a side profile portion of a cable. The cable forms a continuous cable loop. A cable defect detection processor is in communication with the at least one imaging device. The cable defect detection processor is configured to receive images from the at least one imaging device, to identify features in the images that indicate potential defects, and to output a location on the continuous cable loop of the features in the images that indicate potential defects.

In some embodiments, the cable defect detection processor is configured to track a location of the images in response to detecting a marker on the continuous cable loop and an indicated velocity of the continuous cable loop. The marker may include one or more visual indicia that correspond to one or more respective coordinate locations on the continuous cable loop. The marker may include one or more magnetized portions that correspond to one or more respective coordinate locations on the continuous cable loop.

In some embodiments, the system further includes a magnetic field detector in communication with the cable defect detection processor. The magnetic field detector is configured to detect the one or more magnetized portions of the continuous cable loop and to output an indicia of when the magnetized portion of the continuous cable loop is detected to the cable defect detection processor. The one or more magnetized portions of the continuous cable loop may include one or more patterns of magnetized portions that each indicate a respective coordinate location on the continuous cable loop, and the cable defect detection processor is configured to track a location of the potential defects in response to the indicia.

In some embodiments, an electromagnetic field generator is configured to generate an electromagnetic field that magnetizes an adjacent portion of the continuous cable loop. The electromagnetic field generator may be in communication with the cable defect detection processor, and the cable defect detection processor may be further configured to control the electromagnetic field generator to generate an electromagnetic field that magnetizes an adjacent defect portion of the continuous cable loop responsive to the location on the continuous cable loop of the features in the images that indicate potential defects.

In some embodiments, the electromagnetic field generator is configured to magnetize the defect portion in a magnetized pattern of different magnetic polarities and/or alternating magnetic and non-magnetic regions to encode an identifier for the potential defect into the adjacent portion of the continuous cable loop. The magnetized pattern may correspond to an indicia of a type of defect, a location of a defect and/or a degree of a defect.

In some embodiments, the cable defect detection processor outputs an image and a location of a potential detect to an operator. The cable defect detection processor may be configured to classify a potential defect as one of a plurality of potential defects in response to an image from the at least one imaging device.

In some embodiments, the at least one imaging device comprises at least two imaging devices that are mounted at different lines of site to the continuous cable loop and are configured to detect different first and second edge profiles of the continuous cable loop.

In some embodiments, the system includes at least one backlight and/or frontlight configured to illuminate the continuous cable loop.

In some embodiments, the continuous cable loop is configured to rotatably move past the at least one imaging device, the continuous cable loop comprises one or more connected units connected to the cable, and the at least one imaging unit comprises a void that is configured so that the one or more connected units of the continuous cable loop pass through the void during rotation of the cable loop.

In some embodiments, a cable safety and maintenance vision method includes capturing images of a side profile portion of a cable with at least one imaging device, wherein the cable forms a continuous cable loop; identifying features in the images that indicate potential defects; and outputting a location on the continuous cable loop of the features in the images that indicate potential defects.

In some embodiments, a computer program product for cable safety and maintenance includes a computer readable storage medium having computer readable program code embodied in the medium, the computer readable program code includes: computer readable code to receive images of a side profile portion of a cable, wherein the cable forms a continuous cable loop; computer readable code to identify features in the images that indicate potential defects; and computer readable code to output a location on the continuous cable loop of the features in the images that indicate potential defects.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that, the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of invention disclosed herein are directed to a cable safety and maintenance vision system that visually inspects a moving cable of a cable transportation system, which may include, but is not limited to, a cable car transportation system, a ski chair transportation system, a gondola transportation system, an elevator car lift system, an aircraft launch cable system, aircraft landing cable arresting system, ship anchor cables, other cable driven system, etc. The cable safety and maintenance vision system includes multiple high-speed high-resolution digital cameras that observe light reflected from the moving cable that is lit by one or more backlights. The system further includes a computer that executes image processing software configured to inspect the moving cable for defects, and may be capable of detect and report cable defects that are, for example, as small as $\frac{1}{32}$nd of an inch. Detected defects can be reported by tiered reporting alarms having corresponding different defined threshold levels to alert operators of such defects. Some of the reporting alarms can be set to report defects that will be fixed/inspected during scheduled maintenance times, while other reporting alarms can trigger the cable transportation system to stop operation. The computer system can store digital images captured by the digital cameras of detected defects, and may include digital images of the defects in reports to a human operator. Defect reporting rules may be defined that control which defect images are reported to the operator and/or how the defect images are grouped for reporting. The cable safety and maintenance vision system may also generate statistics that are accumulated over time on various defined metrics of the cable and can generate reports for scheduling maintenance and/or replacement of the cable, and operational management of the cable transportation system.

The cable safety and maintenance vision system may operate to increase reliability of the cable transportation system by detecting defects before they are sufficiently large to necessitate unplanned shut-down of the cable transportation system. The cable safety and maintenance vision system may enable more rapid human inspection and, if needed, repair of the cable by showing a human operator an image of the defect shortly after it is observed by the vision system. The metrics, statistics, and reports generated by cable safety and maintenance vision system can enable better planning of maintenance and repairs and improved operational management of the cable transportation system by human managers and administrators. The position of the splice in the cable loop can be detected and tracked as it moves throughout the system from a fixed point, or its location can be used as a reference point from which distances to detected defects are measured.

Figure 1:
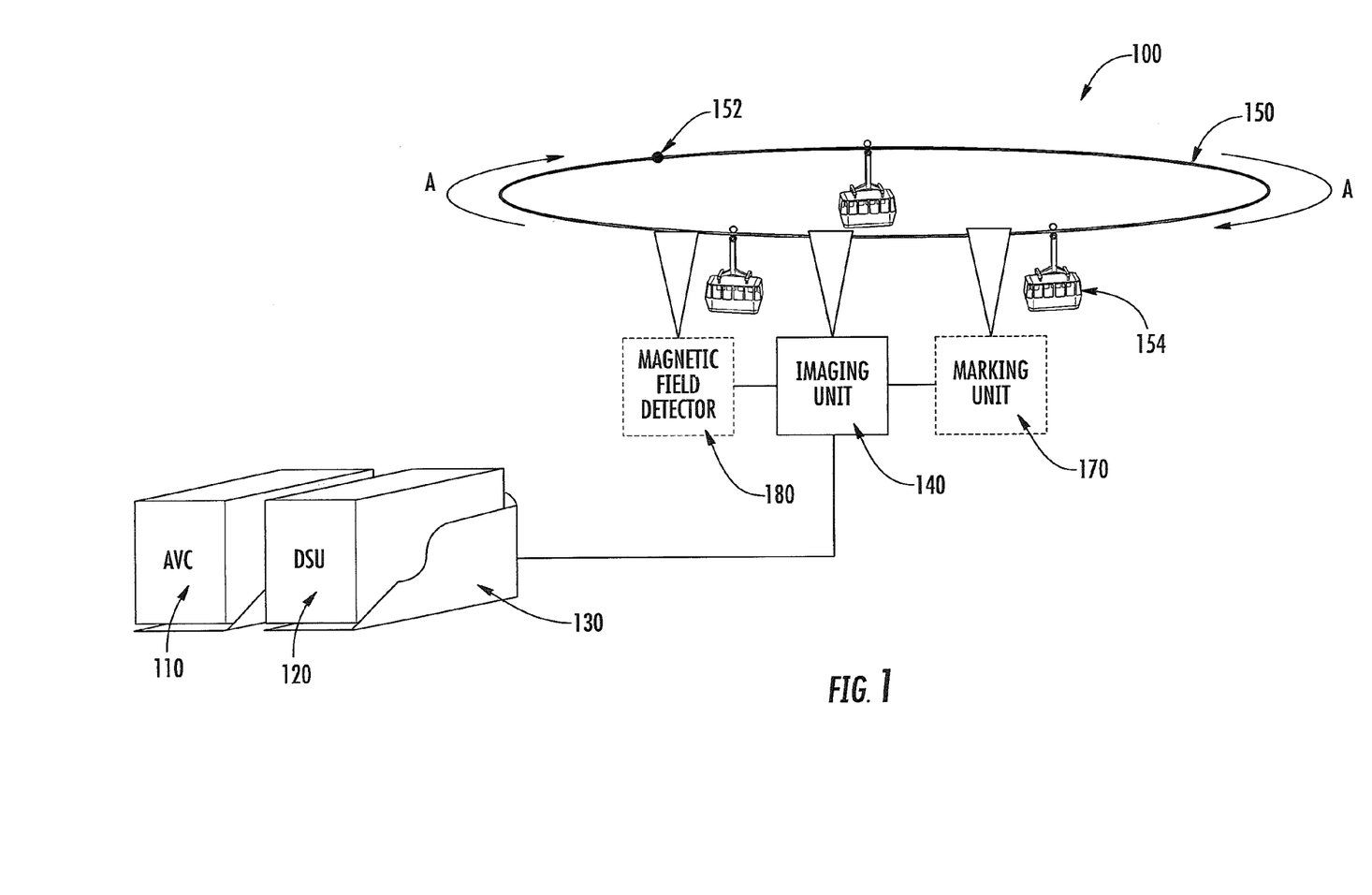
FIG. 1 is a schematic diagram of a cable inspection system having one or more imaging device(s) and a image capture controller which receives and processes digital images from the one or more imaging devices that are positioned to view a cable under observation, and provides the digital image to a digital server unit according to some embodiments.

FIGS. 1-11 illustrate example components of cable safety and maintenance vision systems that configured according to some embodiments of the present invention. FIG. 1 illustrates a system 100 having an image capture controller 110 and a digital server unit (DSU) 120 on a rack 130 that is in communication with an imaging unit 140 that is configured to capture images from a cable 150. The image capture controller 110 receives and processes digital images from one or more digital cameras in the imaging unit 140 that are positioned to view the cable 150. The system 100 may include a marking unit 170 that is configured to mark the cable 150 as it passes by the marking unit 170 and a magnetic field detector 180. The digital server unit 120 can be a computer system that executes software configured to detect cable defects in the cable. The controller 110 and DSU 120 may be mounted to a common rack 130 and communicatively connected through a computer bus cable, or may be spaced apart and connected by a communication network. Although the controller 110 and the DSU 120 are illustrated as separate elements from the imaging unit 140, the marking unit 170, and the magnetic field detector 180, it should be understood that the functionality of the controller 110, the DSU 120, the imaging unit 140, the marking unit 170 and/or the magnetic field detector 180 may be combined in one or more devices or a combination thereof.

The cable 150 may be a continuous loop cable (such as a cable car cable, a ski lift cable, an elevator cable or a conveyor belt) and may be connected to a drive system that moves or rotates the cable 150 in direction A. The cable 150 may include one or more markers 152 and one or more connected units 154 that extend away from the cable 150 and are connected thereto. The connected units 154 may be cable cars, gondola cars, ski lift seats or other objects that may be secured to the cable 150 during use.

The marker 152 may be used to determine a coordinate location along the cable 150. The marker 152 may be any suitable indicia that can be detected by the imaging unit 140, the magnetic field detector 180 or other detector(s), including visual markers that may be detected in an image by the imaging unit 140 or magnetized portions that may be detected by the magnetic field detector 180. For example, the imaging unit 140 may visually track when it views the marker 152 in an image, and based on the time when the marker 152 is observed and the speed with which the cable 150 rotates (e.g., as determined by a tachometer), the imaging unit 140, the controller 110 and/or the DSU 120 may track further locations along the cable 150, e.g., by a certain distance from the marker 152 to identify locations of potential detected defects. In some embodiments, the marker 152 is a visual indicia, such as a paint color that contrasts with the color of the cable 150, such as a white paint mark. In some embodiments, the marker 152 is a magnetized portion of cable 150 that is formed by exposing the cable 150 to a magnetic field or by applying a magnetic paint or adhesive substance to the cable 150. The marker 152 may be a visual indicia of the splice in the cable or a magnet or magnetized portion at the splice point. The marker 152 can be a magnet, such as a strong earth magnet, that is inserted into the cable. For example, magnet(s) may be inserted into the splice core of the cable 150. In some embodiments, the marker 152 is formed on the cable 150 using the marking unit 170; however, the marker 152 may be formed on the cable 150 during the manufacturing of the cable 150 or prior or during cable installation. For example, the marking unit 170 may apply paint, tape or other visual markers and/or the marking unit 170 may apply a magnetic field or magnetic paint to the cable 150 to magnetically mark the cable 150.

In one embodiment, the marking unit 170 includes an electromagnet that is positioned adjacent the cable 150. The electromagnet can be selectively energized by the DSU 120 responsive to detecting a cable defect in image signals from the imaging unit 140. The electromagnet may be energized in opposite polarity directions to selectively generate a corresponding polarity magnetic field at a flux density level that causes an adjacent portion of the cable 150 to retain a magnetic field of that polarity direction. An encoded identifier (e.g., an address) for the defect may be generated by energizing the electromagnet using a sequence of polarity directions defining the identifier. In some embodiments, encoded identifiers may be used to define a location along the cable 150 such that, when a potential defect is detected, an adjacent identifier may be used to define a location of the defect.

In some embodiments, the marker 152 may be a magnetized portion of the cable 150 that has an associated magnetic polarity direction. The magnetic field detector 180 may detect when the magnetized portion (e.g., the marker 152) of the cable 150 passes adjacent the detector 180, e.g., to determine a location coordinate of an image. The location of the marker 152 as determined by the magnetic field detector 180 may be communicated to the imaging unit 140 and/or the controller 110 and/or the DSU 120. The magnetic field detector 180 may be a Hall effect sensor that detects changes in magnetic fields; however, any suitable detector may be used.

The marker 152 may be a single marker or a pattern of markers, such as a pattern of paint color or colors, or a pattern of magnetic and non-magnetic portions and/or different magnetized polarities. Different patterns may encode information about the cable 150, such as a particular coordinate location on the cable loop.

In some embodiments, a potential defect event may serve as the marker 152. For example, when a potential defect event is detected by the imaging unit 140, a time stamp may be recorded, and optionally, an image of the defect may be transmitted to the controller 110 and/or the DSU 120. The controller 110 and/or the DSU 120 may track each event with its relative position from the imaging unit 140 by calculating a distance from the imaging unit 140 based on an amount of time and the speed of the cable 150. A region of cable, such as a block of ten feet on either side of the event, may be determined for accumulating other events in the same area. A variable to add or subtract from the length of the cable 150 can compensate for any cable stretch and/or stabilize a position of the defined block. A confidence index can be updated on each pass of the defect through the imaging unit 140 with the original event positioned at the center of the defined block. If no event is detected on the next pass(es) through the imaging unit 140, then the event may be deleted as a false positive. An operator viewing an image of the potential defect event may also determine the severity of the event and/or that the event is a false positive (e.g., environmental abnormalities, such as dirt, insects, water, etc). In particular embodiments, a rain setting may be used to suspend processing images until after the rain has cleared.

In some embodiments, the marking unit 170 may be configured to mark a defect portion of the cable 150 as it passes adjacent the marking unit 170, for example, by applying a paint or other visual marker, by applying a sufficient magnetic field to magnetize the cable and/or by applying a magnetic paint. Moreover, a pattern of markers, such as a pattern of visual markers (e.g., paint stripes of one or more widths) or a pattern of magnetic and non-magnetic portions and/or a pattern of magnetized polarities, may be used to identify and convey information about a cable defect. In particular embodiments, the marking unit 170 may further be configured to remove a marker 152, for example, after a marked defect is fixed. A color of paint may be applied that covers or obscures the marking paint. In the case of the marker 152 including a magnetized portion of the cable, the marking unit 170 may apply a different magnetic field (e.g., of opposite polarity) configured to demagnetize or reverse a direction of the previously applied magnetization, or write an updated identifier to the cable 150. The marking unit 170 can be configured to re-mark the cable 150 at a given coordinate at each pass of the cable 150 adjacent the marking unit 170.

Figure 2:
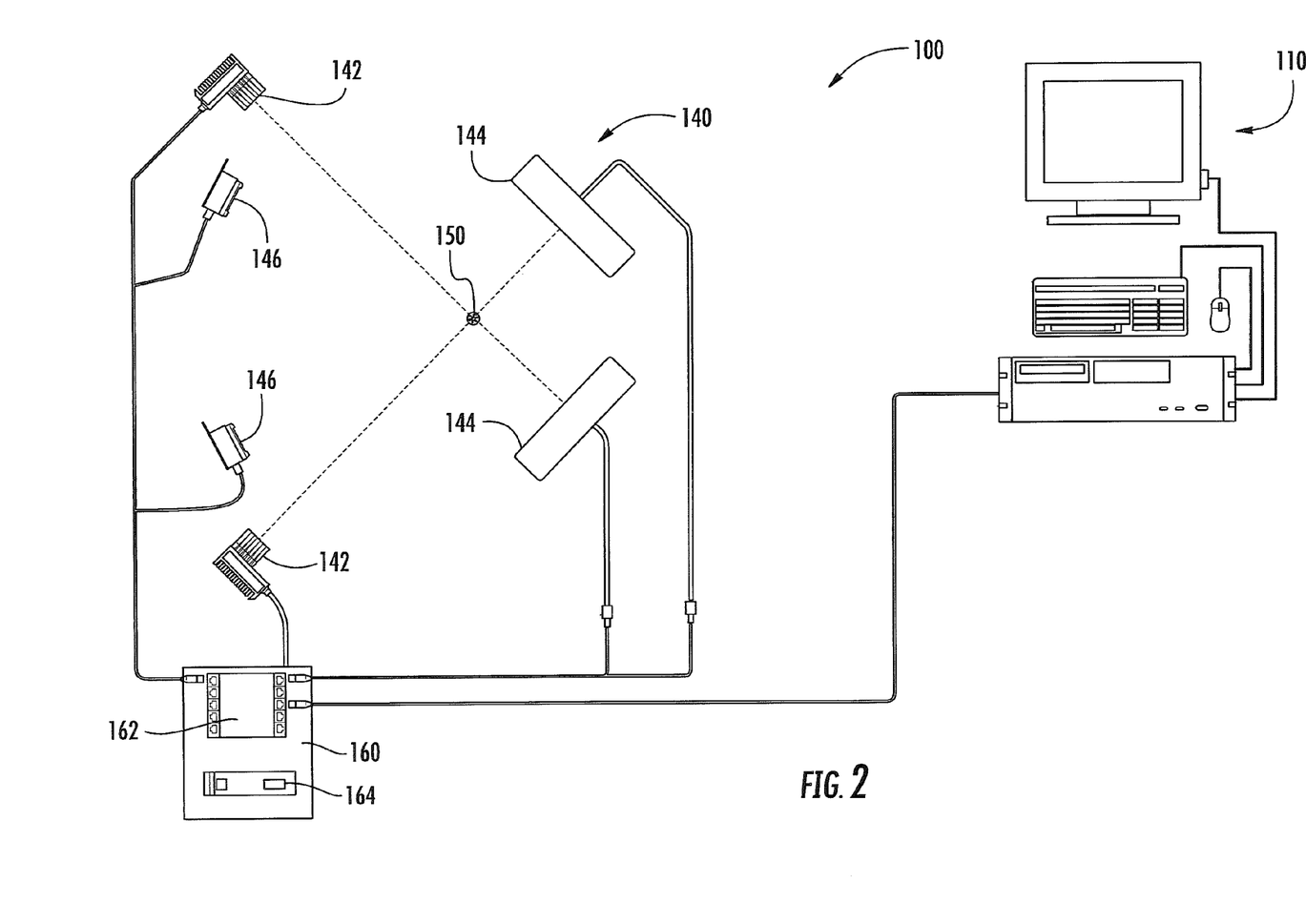
FIG. 2 is a front view of an example cable safety and maintenance vision inspection system that includes two front lights and two backlights that are positioned to illuminate a cable according to some embodiments.

As illustrated in FIG. 2, an example imaging unit 140 includes two cameras 142, two front lights 144 and two backlights 146 that are positioned to illuminate the cable 150. The two cameras 142 are positioned to receive light reflected off the cable from the front lights 144 and to receive light from the backlights 146 that is not blocked by the cable. A computer system (e.g., including the controller 110 and/or DSU 120) including a cable defect detection processor 112, which can be located within an inspection office can include, for example, a personal computer, a display monitor, a keyboard, a mouse, etc. The imaging unit 140 may be connected to various electronics 160, including a communication network, such as an Ethernet switch 162, and a power supply 164. Although two cameras, two front lights, and two backlights have been illustrated in the system of FIG. 2, any number of such components may alternatively be used.

Figure 3:
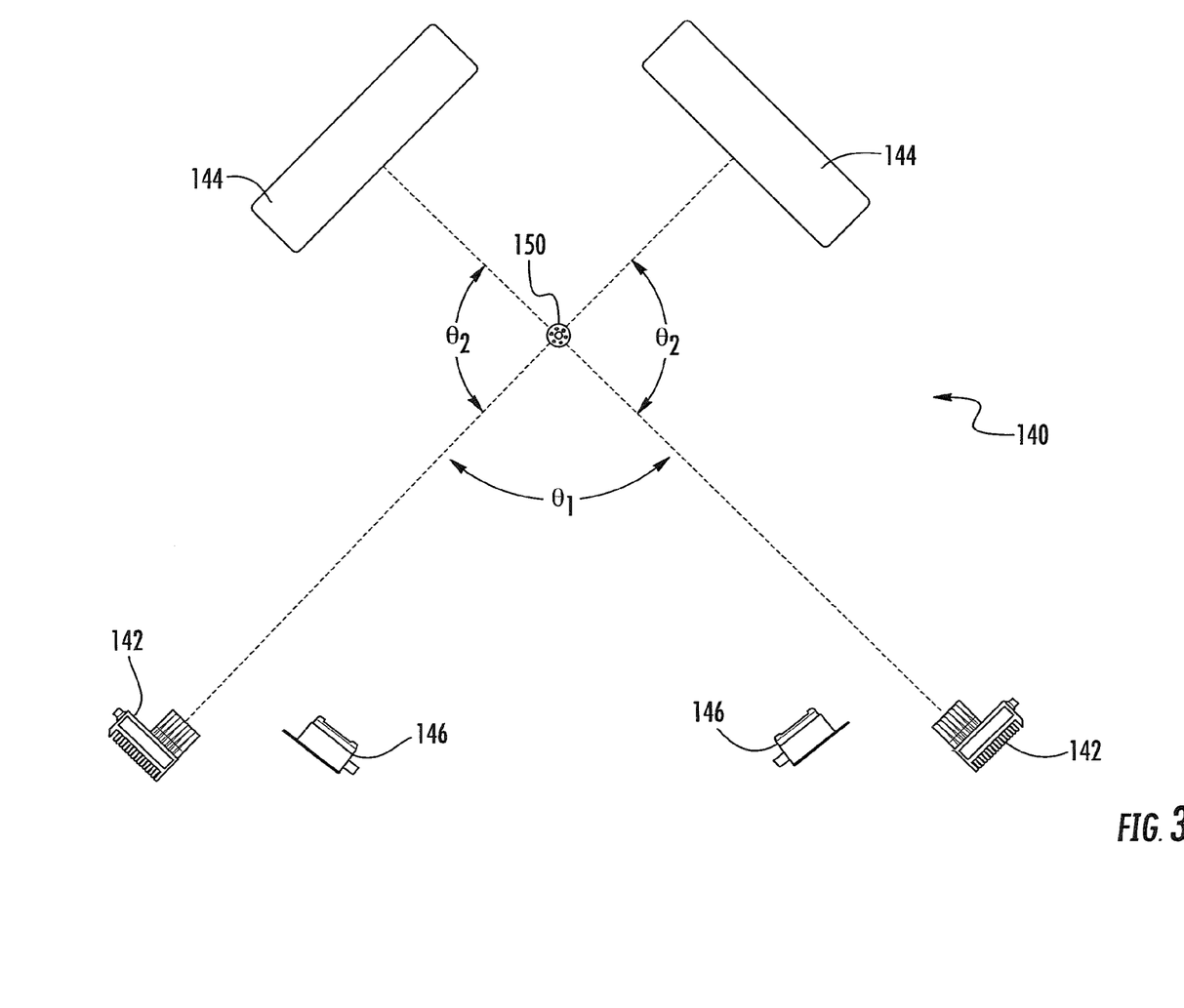
FIG. 3 is an enlarged front view of a non-limiting example configuration of the lighting and cameras of FIG. 2.

FIG. 3 is an enlarged view a non-limiting example configuration of the lighting (front lights 144 and backlights 146) and cameras 142 of FIG. 2. The cameras 142 may be angularly spaced apart at an angle $\Theta_1$ relative to the cable to monitor the whole cable surface. Each camera 142 receives an image that shows a middle portion of the cable 150, where irregularities are generally more difficult to detected, and an outer edge portion defined by the silhouette of the cable 150, where irregularities are generally more easily detected. In some embodiments, the angle $\Theta_1$ is offset from 180 degrees so that the cameras 142 receive images that show different edge profiles or silhouettes of the cable 150 to monitor a greater portion of the cable surface. As illustrated, the angle $\Theta_1$ is about ninety degrees. The backlights 146 can similarly be angularly spaced apart at an angle $\Theta_2$, which in some embodiments, is ninety degrees opposite to the cameras 142 from the cable 150. For a cable 150 that is sufficient for use with a cable car transportation system, the cameras 142 can be mounted about 32 inches from the cable, and movable +/−2 inches relative to the cable. The backlights can be mounted 14.5 inches from the cable, and movable +/−2 inches. The front lights 146 can be spaced apart between the cameras 142 and each mounted about 5 inches from an adjacent one of the cameras 142. Mounting brackets for the cameras 142 and backlights 144 can be adjustable so that the cameras 142 and backlights 144 can be tiled to be inline with each other and spaced apart about 45 degrees around the cable. Other angular configurations and relative distances between the illustrated components may be used.

The dimensions of the cable safety and maintenance vision system are variable depending upon, for example, pathway of the cable past one or more digital cameras of the system, diameter of the cable, number of digital cameras that are configured to observed defects in the cable, number of backlights and needed lumens for illuminating the cable, desired angle of illumination of the cable relative to the angle of observation of the camera(s), etc. The backlight distance dimensions can vary based on the lumen output and size of a backlight diffusion panel or other device(s) used to illuminate the cable. A third variable on future applications would be the speed of the cable. For example, a cable speed of 10-14 mph may be used. Temperatures and pressures are only limited by the Environmental ratings of the Equipment being used. The Environment should preferably be free of flying debris or moisture.

In some embodiments, the elements of the imaging unit 140, such as the cameras 142, backlights 144 and front lights 146, are spaced apart from the cable 150 and include a void or free space through which any elements that are connected to the cable 150, such as the connected units 152 (e.g., cable cars, ski lift seats or other objects that may be secured to the cable 150) may pass without obstruction. In this configuration, the cable 150 may be inspected by the system 100 while the cable 150 is in use and without requiring that any connected units 152 be removed.

In one embodiment, the field of view for each of the cameras 142 may encompass 2 feet of the cable 150 at a cable speed of 10 mph with a 0.050 ms exposure time. A faster frame rate with adequate resolution would allow for a smaller area to be captured per frame.

The optional front lights 146 make images more appealing and more informative to a human viewer of the fault image. However, the front lights 146 are not necessary, as the backlights 144 may provide sufficient illumination of the cable. Alternative, the front lights 146 may be used instead of backlights 144. In some embodiments, the cameras 142 may have sufficient image quality and/or resolution without the use of either backlights 144 or front lights 146.

Figure 4:
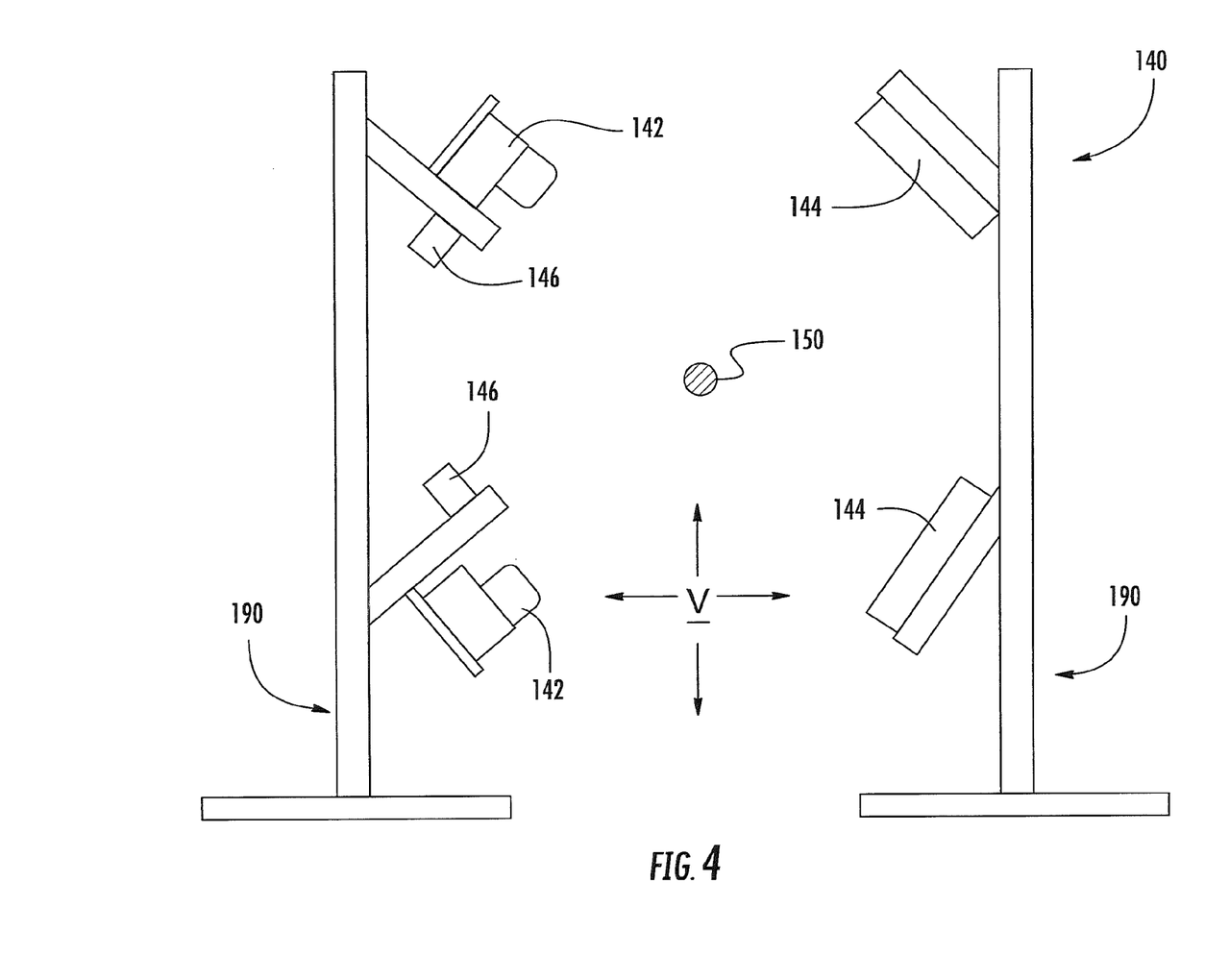
FIG. 4 is a front view of a non-limiting example configuration of the lighting and cameras of an example cable safety and maintenance vision inspection system having a mounting bracket according to some embodiments.
Figure 5:
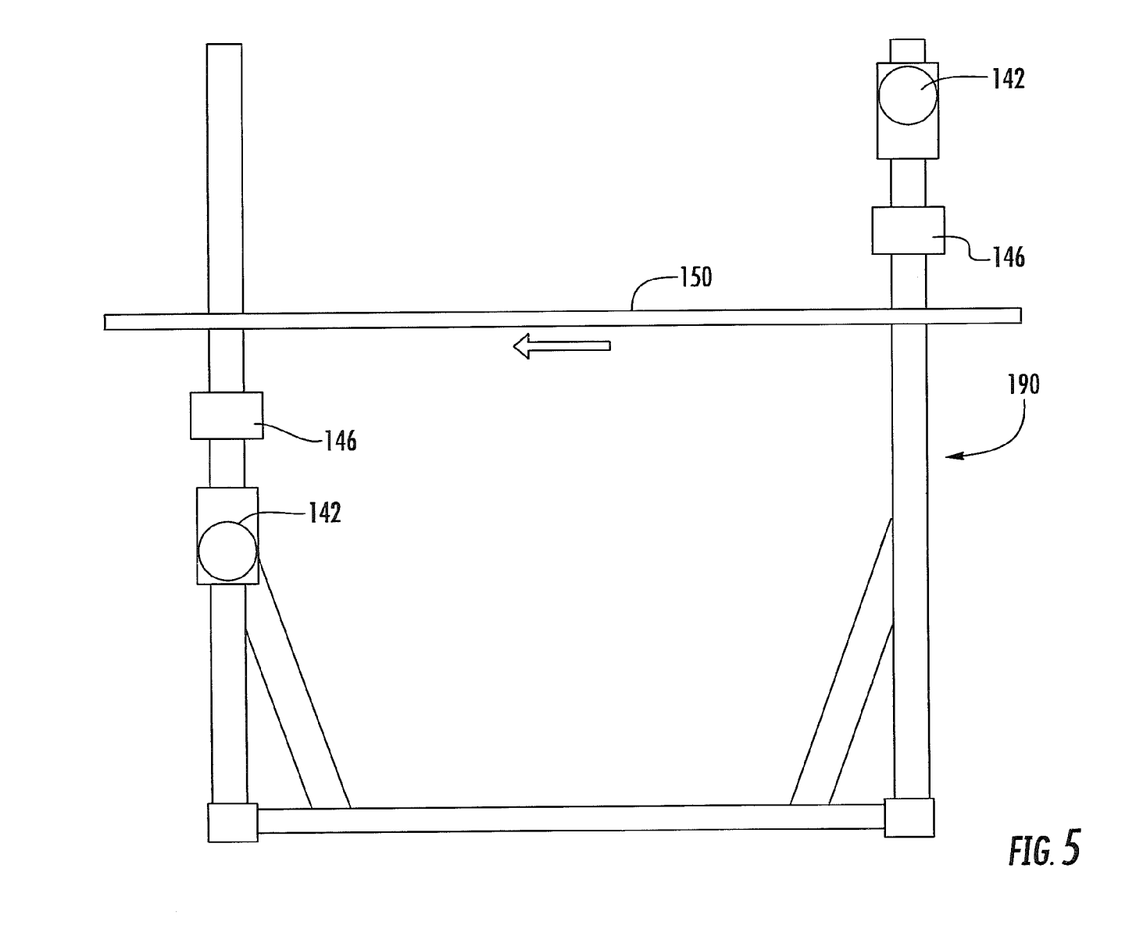
FIG. 5 is a side view of the front lighting and cameras of FIG. 4.

As shown in FIGS. 4 and 5, the cameras 142, backlights 144 and front lights 146 may be mounted on one or more mounting brackets 190. As illustrated in FIG. 4, the mounting brackets 190 are spaced apart to define a void V. In this configuration, connected units 154 (FIG. 1) that extend away from the cable 150, such as ski lift chairs, cable cars, etc. may pass through the void V of the imaging unit 140, and the cable 150 may be visually inspected by the cameras 142 without requiring that any connected units 154 be removed. Therefore, the cable 150 may be inspected during normal operation, for example, of a ski lift or cable car system, without any interruption of service.

As shown in FIG. 5, the cameras 142 may be spatially offset from one another. In this configuration, a section of the cable 150 may be imaged at different times sequentially as the cable 150 moves past the cameras 146. If a potential defect is not observed in one of the images captured by the cameras 146, the defect may be observed in the other image of the same portion of the cable 150. In some embodiments, the frequency of images captured by the cameras is selected so that the area of the cable 150 imaged by each of the cameras 146 overlap with one another to reduce a likelihood of missing potential defects.

Each of the cameras 142 send fault images to the computer system 110/120, such as through an FTP client, where they can be imported into a user interface. In some embodiments, the computer system 110/120 can include a cable defect detection processor or module that receives the images and identifies features in the images that indicate potential defects. The cable defect detection processor or module can output a location on the continuous cable loop of the features in the images that indicate potential defects. The user interface may perform defined access modes each with various feature levels, including but not limited to, a monitor mode, an operator mode, and a supervisor mode.

The monitor mode can include automated alarming, fault image report archiving, and/or excessive fault alarming. For automated alarming, the camera will trigger defects at multiple alarm levels and the operator will be able to display the images of the cable that caused the alarm from the user interface. For fault image report archiving, the system will automatically archive batches of fault image reports with timestamps based on either duration of time or if a folder size limit is exceeded. For excessive fault alarming, the system will alarm if a defined set of conditions have caused an excessive number of alarms that would be indicative of an environmental anomaly or damage to instrumentation and would need human intervention.

The monitor mode can include single fault report image review, dual angle side-by-side image review, fault report image batch review, alarm clearing, image archiving, and/or image forwarding. For single fault report image review, the human inspector (Operator) can bring up any fault report images for closer inspection to make decisions and append notes to the report. For dual angle side-by-side image review, the Operator can bring up any fault report images from two different angles of the same portion of cable for closer inspection to make decisions and append notes to the report. The dual angle side-by-side image review mode may be only possible when both angles of the cable capture actually cause a fault image report which is not always the case. For fault report image batch review, the Operator can call up a batch of fault image reports over a period of time for review in a scrolling fashion more quickly than in single fault report image review. For alarm clearing, the Operator can clear alarms once they are deemed not necessary for immediate action or if the fault has been fixed. For image archiving, the Operator can choose specific fault image reports or batches of fault image reports to archive in a separate specific location if desired. For image forwarding, the Operator can choose to forward fault image reports to a Supervisor.

The supervisor mode can include image capture on command, low speed splice capture, and fault statistics report generator. Image capture on command enables a Supervisor to command the camera capture a sample section of the cable upon command and record the images at a specific location of the cable once or over multiple passes. For low speed splice capture, moving at no more than defined percentage (e.g., 10%) of normal cable revenue speed, the Supervisor can decide to run the splice or any other particular section of the cable past the camera to get a set of 100% coverage images for archiving or comparison to other captures on a later date. Fault statistics report generator enables the Supervisor to create a report of alarm statistics over a period of time.

Figure 6:
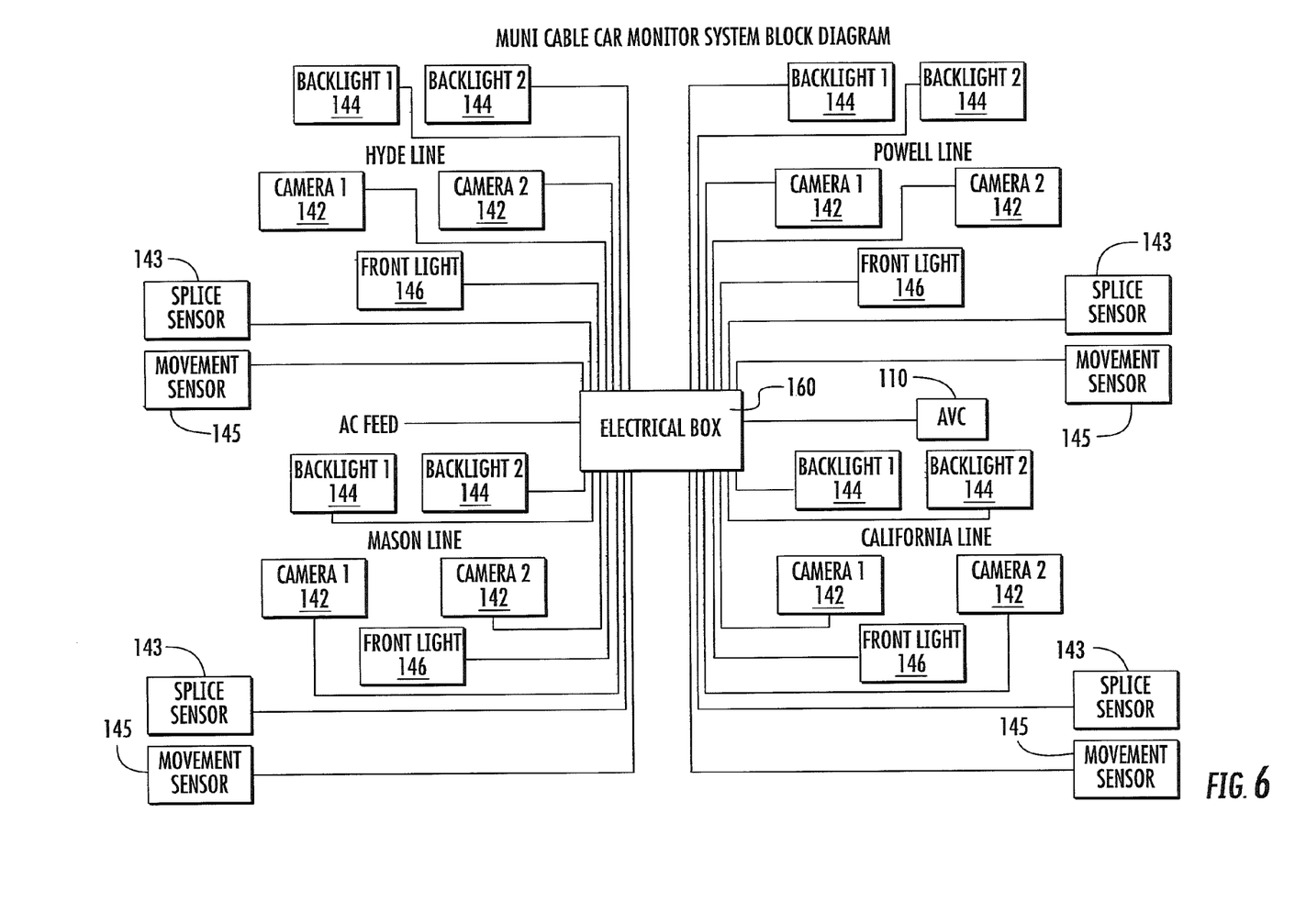
FIG. 6 is a schematic diagram of various components of FIGS. 2-5 that have been replicated to monitor four separate cable car lines.

FIG. 6 illustrates various components of FIGS. 2-5 that have been replicated to monitor four separate cable car lines (e.g., "Hyde Line", "Mason Line", "Powell Line", and "California Line"). A splice sensor 143 is further included to detect when a cable splice (e.g., a cable splice connector) moves past the cameras. A movement sensor 145 is included to monitor speed of the cable 150 and determine distance from an observed event (e.g., detecting presence of a cable splice) to defects that are detected on the cable 150. The splice sensor 143 and movement sensor 145 are connected to the computer system 110/120 (e.g., illustrated as the "Human Interface PC") via the communication network (e.g., Ethernet), illustrated by the electrical box 160.

The computer system 110/120 executes image processing software, which may include cable defect detection software, configured to analyze images from the cameras to detect and report cable defects. The images can be digital images and can include camera images or images from a video camera. The software includes defect detection rules that define characteristics that are observable in the images that correspond to, for example, a broken strand in braiding of the cable, a threshold number of broken strands in a threshold length of the cable, dentations in the cable having a depth exceeding a defined threshold, etc. Detected defects can be reported by tiered reporting alarms having corresponding different defined threshold levels to alert operators of such defects. Some of the reporting alarms can be set to report defects that will be fixed/inspected during scheduled maintenance times, while other reporting alarms can trigger the cable transportation system to stop operation. The computer system 110/120 can store digital images captured by the digital cameras 142 of detected defects, and may include digital images of the defects in reports that are logged for viewing and/or that are communicated to a human operator. Defect reporting rules may be defined that control which defect images are reported to the operator and/or how the defect images are grouped for reporting. The cable safety and maintenance vision system 100 may also generate statistics that are accumulated over time on various defined metrics of the cable 150 and can generate reports for scheduling maintenance and/or replacement of the cable 150, and operational management of the cable system.

Figure 7:
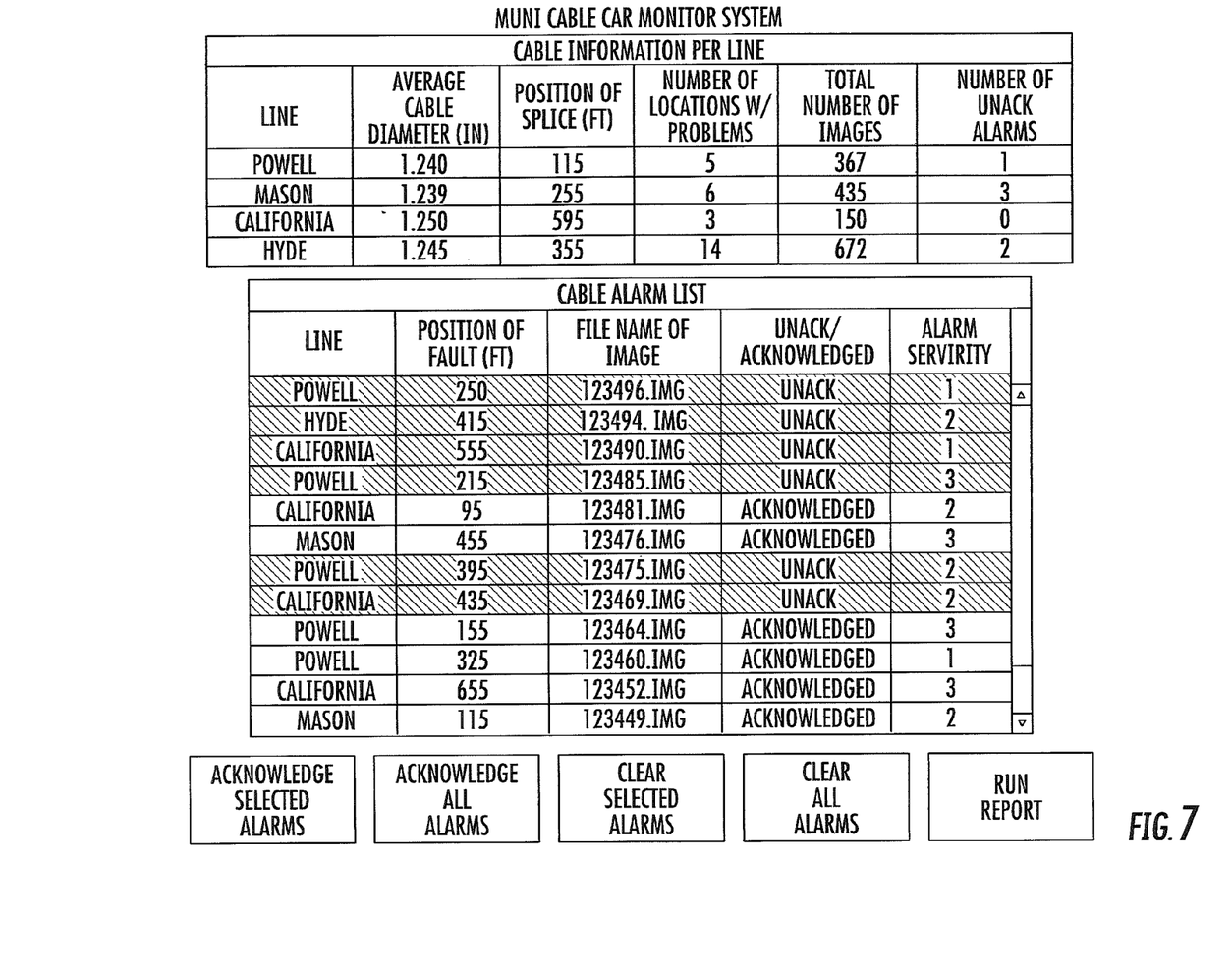
FIG. 7 illustrates an example report generated by the computer system for the four cable car lines of FIG. 6 and which may be stored in a file and/or displayed on a display device for observation by a human inspector.

FIG. 7 illustrates an example report generated by the computer system for the four cable car lines of FIG. 6 and which may be stored in a file and/or displayed on a display device for observation by a human inspector. For example, the system has reported 5 problem (defect) locations on the cable, has recorded 367 images from the cameras of the cable which contain other potential defects which should be visually analyzed by a human inspector, and has generated 1 unacknowledged (UNACK) alarm from the detected defects. The computer system may further identify the distance along the cable from a reference point (e.g., the splice) to each of the 5 reported problems and each of the 367 imaged locations of the cable.

A cable alarm list table identifies the cable car line, the position of the fault (defect) along the cable from the reference point, the file name of the corresponding stored image of the fault, whether the alarm has been acknowledged (e.g., analysis completed by a human inspector) or not acknowledged (e.g., analysis not completed), and the alarm severity level (e.g., a tiered severity level assigned by the computer system to the observed defect).

Figure 8:
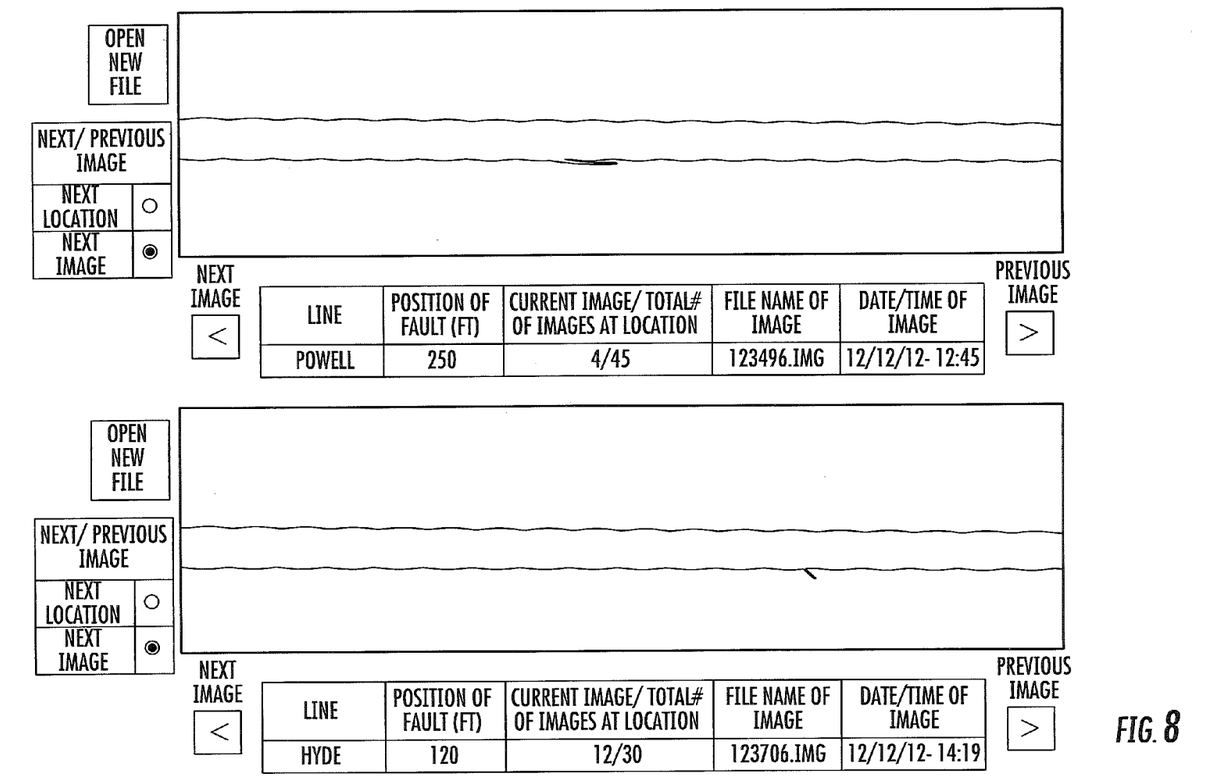
FIG. 8 illustrates images captured by the computer system of defects detected in the cable.

FIG. 8 illustrates images captured by the computer system (from the image stream output by the cameras) of defects detected in the cable 150. The upper image illustrates that the position of the fault is 250 feet from a reference point, identifies that this image number 4 of 45 images that have been collected over time for this defect at that location, identifies a file name of the image file, and identifies a date and time at which the image was recorded. The lower image similarly illustrates a fault that has been detected 120 feet from a reference point on another cable car line, and provides similar information as explained above for the upper image. An inspector can sequentially view other images that have been collected for the defect on the cable 150 over time in order to, for example, determine how the defect has changed over time and determine whether/when remedial action should be taken. In some embodiments, the cable 150 twists as it rotates along the cable path. The imaging unit 140 may capture images of the cable 150 as the cable 150 moves over successive rotations along the cable pathway. At each pass, the cable 150 may be at a different angle due to natural rotations as it moves along the cable pathway. Successive images may be analyzed or reviewed at different capture angles to provide a more robust analysis of a potential fault or defect.

Figure 9:
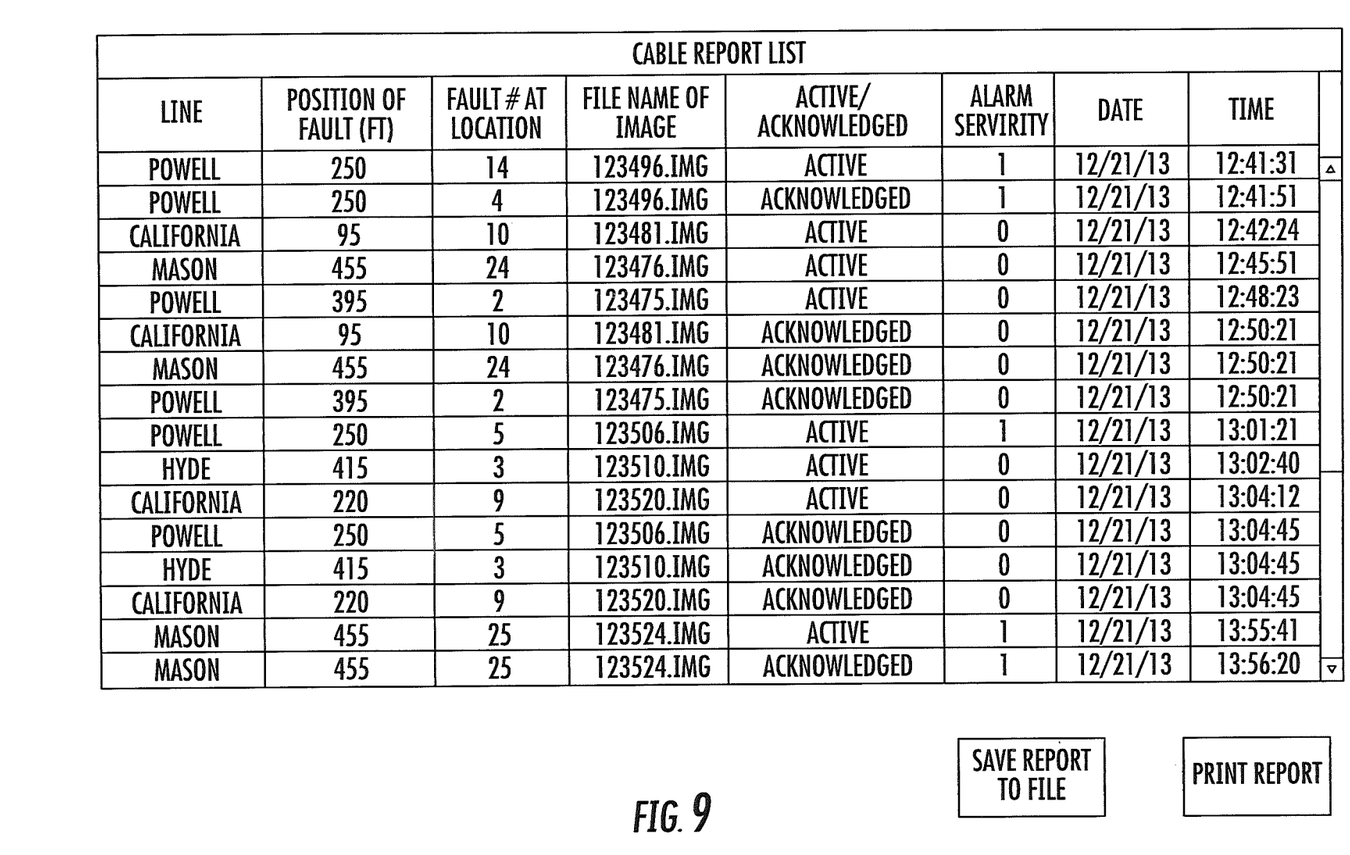
FIG. 9 illustrates an example cable report.

FIG. 9 illustrates a cable report list that identifies the cable car line, the position of detected faults, the fault number at locations, the file name of the capture image of the fault, whether the fault has been acknowledged or has not yet been acknowledged ("active") by a human inspector, the alarm severity level determined by the computer system, and the date and time of the detected fault.

Figure 10:
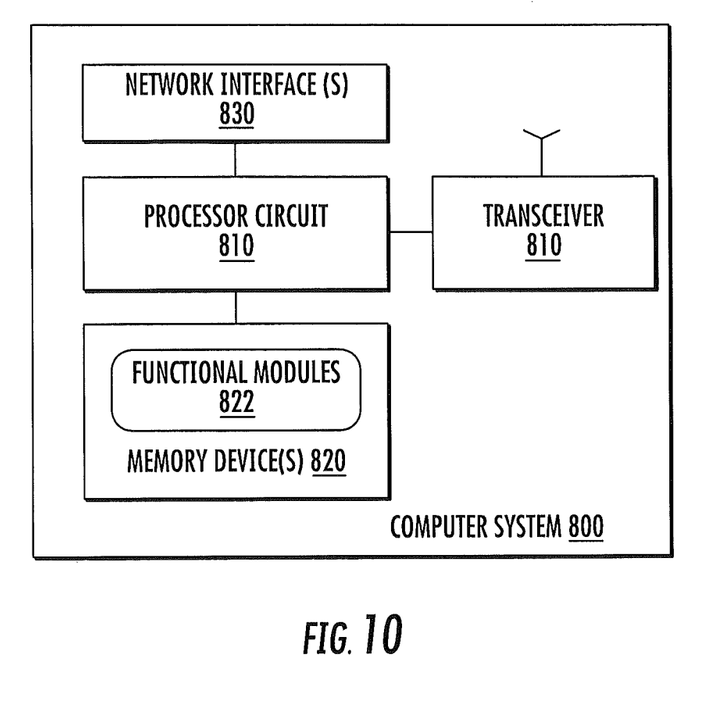
FIG. 10 illustrates an example computer system.

FIG. 10 is a block diagram of a computer system 800 that is configured according to some embodiments. The computer system 800 includes a network interface(s) 830 (e.g., Ethernet), a processor circuit 810, and a memory device(s) 820 containing functional modules 820.

The system 800 may further include wireless communication capability, e.g., via transceiver 810 (e.g., LTE or other cellular transceiver, Bluetooth transceiver, WiFi transceiver, WiMax transceiver, etc.) that is configured to communicate via a public/private network with other operator devices. The processor circuit 810 may include one or more data processing circuits, such as a general purpose and/or special purpose processor (e.g., microprocessor and/or digital signal processor). The processor circuit 810 is configured to execute computer program instructions from the functional modules 822 of the memory device(s) 820, described below as a computer readable medium, to perform at least some of the operations and methods of described herein as being performed by the cable safety and maintenance vision system. The network interface 830 communicates with the digital cameras, the splice sensor, the movement sensor and/or other network nodes. It should be understood that the system 800 and the processor circuit 810 may include a cable defect detection processor configured to operate as described herein. Moreover, the processor circuit 810 may be provided in a separate device or the processor circuit 810 may be incorporated into elements of the system 100 of FIGS. 1-5, such as the imaging unit 140 and/or the controller 110 and/or the DSU 120.

Figure 11:
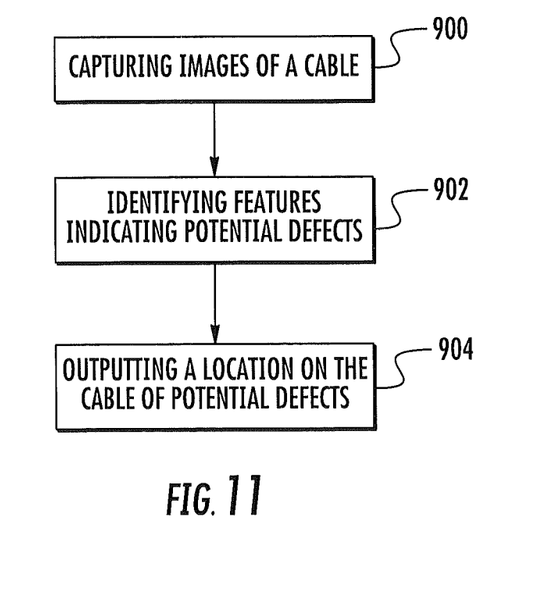
FIG. 11 is a flowchart of operations according to some embodiments.

FIG. 11 is a flowchart of operations according to some embodiments. Images of a side profile portion of a cable are captured with at least one imaging device (Block 900). Features in the images that indicate potential defects are identified (Block 902), and a location on the continuous cable loop of the features in the images that indicate potential defects is output (Block 904).

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

That which is claimed is:

1. A cable safety and maintenance vision system comprising:
   an imaging unit comprising at least one imaging device configured to capture images of a side profile portion of a cable, the cable forming a continuous cable loop;
   a cable defect detection processor in communication with the at least one imaging device, the cable defect detection processor configured to receive images from the at least one imaging device, to identify features in the images that indicate potential defects, and to output a location on the continuous cable loop of the features in the images that indicate potential defects, wherein the cable defect detection processor is configured to track a location of the potential defects in response to detecting a marker on the continuous cable loop and an indicated velocity of the continuous cable loop.

2. The cable safety and maintenance vision system of claim 1, wherein the marker comprises one or more visual indicia that correspond to one or more respective coordinate locations on the continuous cable loop.

3. The cable safety and maintenance vision system of claim 1, wherein the marker comprises one or more magnetized portions that correspond to one or more respective coordinate locations on the continuous cable loop.

4. The cable safety and maintenance vision system of claim 3, wherein the system further comprises a magnetic field detector in communication with the cable defect detection processor, the magnetic field detector being configured to detect the one or more magnetized portions of the continuous cable loop and to output an indicia of when the magnetized portion of the continuous cable loop is detected to the cable defect detection processor; and the cable defect detection processor is configured to track a location of the potential defects in response to the indicia.

5. The cable safety and maintenance vision system of claim 4, wherein the one or more magnetized portions of the continuous cable loop comprises one or more patterns of magnetized portions that each indicate a respective coordinate location on the continuous cable loop.

6. The cable safety and maintenance vision system of claim 1, further comprising an electromagnetic field generator configured to generate an electromagnetic field that magnetizes an adjacent portion of the continuous cable loop.

7. The cable safety and maintenance vision system of claim 6, wherein the electromagnetic field generator is in communication with the cable defect detection processor, and the cable defect detection processor is further configured to control the electromagnetic field generator to generate an electromagnetic field that magnetizes an adjacent defect portion of the continuous cable loop responsive to identifying a potential defect.

8. The cable safety and maintenance vision system of claim 7, wherein the electromagnetic field generator is configured to magnetize the defect portion in a magnetized pattern of different magnetic polarities and/or alternating magnetic and non-magnetic regions to encode an identifier for the potential defect into the adjacent portion of the continuous cable loop.

9. The cable safety and maintenance vision system of claim 8, wherein the magnetized pattern corresponds to an indicia of a type of defect, a location of a defect and/or a degree of a defect.

10. The cable safety and maintenance vision system of claim 1, wherein the cable defect detection processor outputs an image and a location of a potential detect to an operator.

11. The cable safety and maintenance vision system of claim 1, wherein the cable defect detection processor is configured to classify a potential defect as one of a plurality of potential defects in response to an image from the at least one imaging device.

12. The cable safety and maintenance vision system of claim 1, wherein the at least one imaging device comprises at least two imaging devices that are mounted at different lines of site to the continuous cable loop and are configured to detect different first and second edge profiles of the continuous cable loop.

13. The cable safety and maintenance vision system of claim 1, further comprising at least one backlight and/or frontlight configured to illuminate the continuous cable loop.

14. The cable safety and maintenance vision system of claim 1, wherein the continuous cable loop is configured to rotatably move past the at least one imaging device, the continuous cable loop comprises one or more connected units connected to the cable, and the at least one imaging unit comprises a void that is configured so that the one or more connected units of the continuous cable loop pass through the void during rotation of the cable loop.

15. A cable safety and maintenance vision method comprising:
   capturing images of a side profile portion of a cable with at least one imaging device, the cable forming a continuous cable loop;
   identifying features in the images that indicate potential defects;
   outputting a location on the continuous cable loop of the features in the images that indicate potential defects; and
   tracking a location of the images in response to receiving detecting a marker on the continuous cable loop and an indicated velocity of the continuous cable loop.

16. The cable safety and maintenance vision method of claim 15, wherein the marker comprises one or more visual indicia that correspond to one or more respective coordinate locations on the continuous cable loop.

17. The cable safety and maintenance vision method of claim 15, wherein the marker comprises one or more magnetized portions that correspond to one or more respective coordinate locations on the continuous cable loop.

18. A computer program product for cable safety and maintenance comprising: a computer readable storage medium having computer readable program code embodied in the medium, the computer readable program code comprising:
- computer readable code to receive images of a side profile portion of a cable, the cable forming a continuous cable loop;
- computer readable code to identify features in the images that indicate potential defects; and
- computer readable code to output a location on the continuous cable loop of the features in the images that indicate potential defects; and
- computer readable code to track a location of the images in response to detecting a marker on the continuous cable loop and an indicated velocity of the continuous cable loop.

19. The computer program produce of claim 18, wherein the marker comprises one or more visual indicia that correspond to one or more respective coordinate locations on the continuous cable loop.

20. The computer program produce of claim 18, wherein the marker comprises one or more magnetized portions that correspond to one or more respective coordinate locations on the continuous cable loop.

\* \* \* \* \*